Oct. 11, 1927. C. MATLOCK Re. 16,765
METHOD AND APPARATUS FOR PRODUCING CARBON
Original Filed Jan. 5, 1921 2 Sheets-Sheet 1
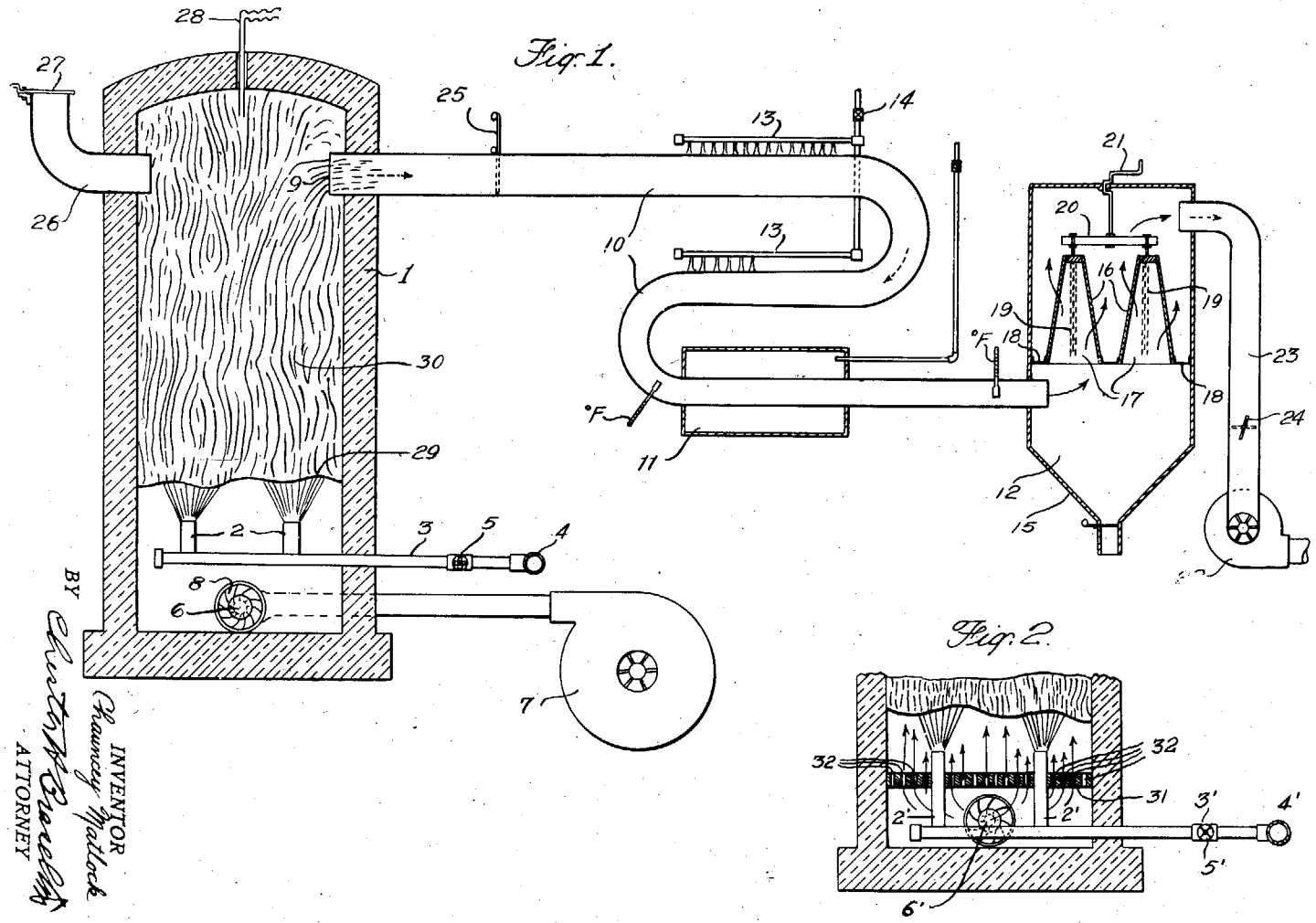

Oct. 11, 1927. Re. 16,765
C. MATLOCK
METHOD AND APPARATUS FOR PRODUCING CARBON
Original Filed Jan. 5, 1921 2 Sheets-Sheet 2
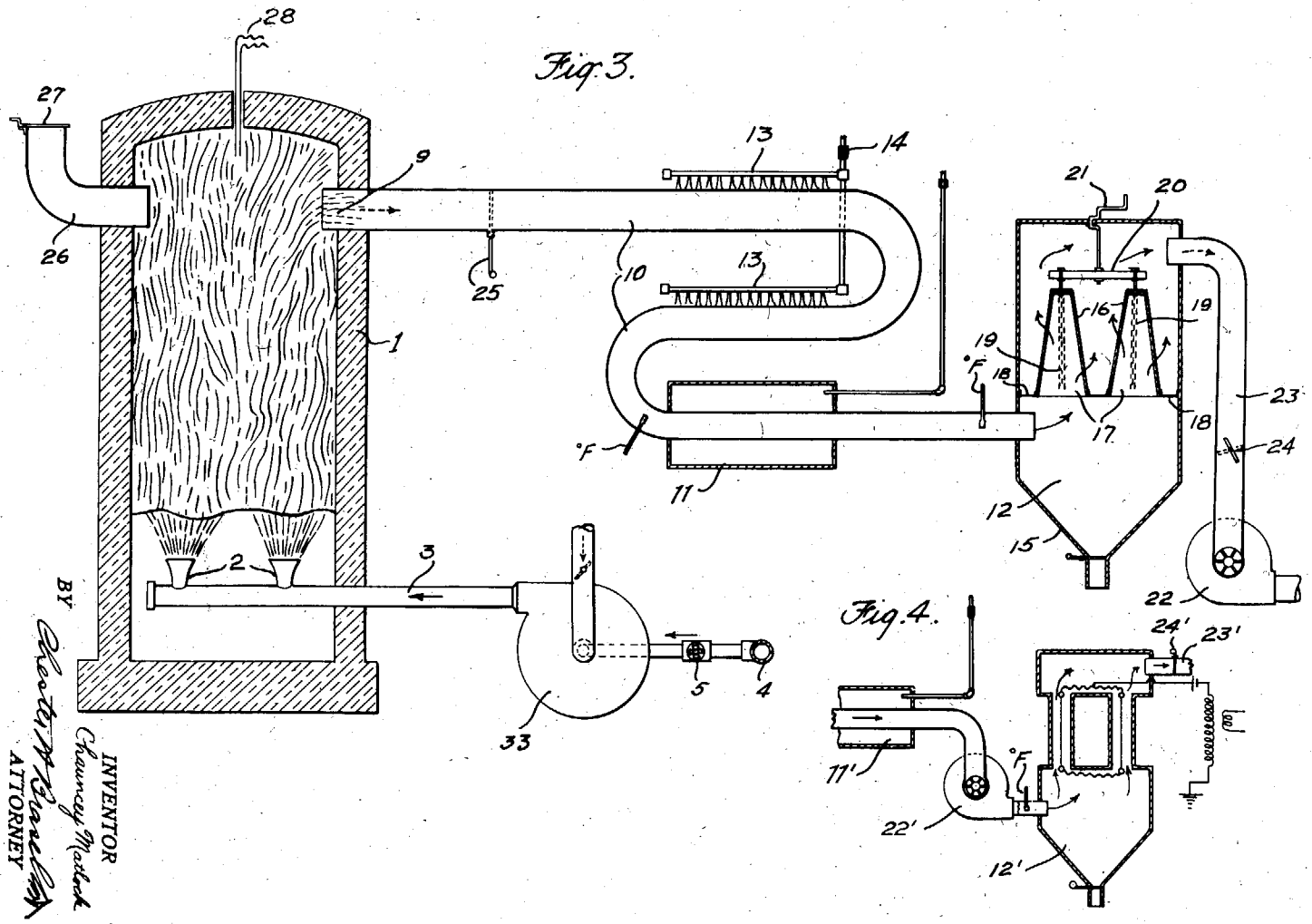

Reissued Oct. 11, 1927. Re. 16,765

UNITED STATES PATENT OFFICE.

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE.

METHOD AND APPARATUS FOR PRODUCING CARBON.

Original No. 1,458,351, dated June 12, 1923, Serial No. 435,071, filed January 5, 1921. Application for reissue filed July 31, 1926. Serial No. 126,304.

This invention relates to the disassociation of the constituents of hydrocarbons and particularly to the disassociation of a hydrocarbon gas and the collection and recovery of the elemental carbon therefrom.

The object of my invention generally is to obtain an improved quality of carbon black from a hydrocarbon gas, for example natural gas, and to recover a larger proportion of the carbon constituent per unit volume of gas than has hitherto been possible with many known methods and devices.

A further object of my invention is a method and an apparatus for producing carbon black whereby the cost of installation and operation of the plant are reduced to a minimum and the efficiency of production generally improved, the operation according to this method, being continuous and non-intermittent.

The method and apparatus generally used for producing carbon black on a commercial scale consists in partially burning the natural gas or other hydrocarbon gas by means of a multiplicity of miniature burners and causing the individual flames or products of combustion to play upon chilled surfaces whereon a portion of the carbon content is deposited and subsequently scraped off. The black thus obtained often contains metallic iron and scale, and other impurities and characteristics which render it unsuitable for certain of its uses. Moreover the apparatus usually employed is crude and comparatively expensive to build and the collecting devices wear very rapidly, necessitating periodic replacements. Further the usual commercial plants are cumbersome and occupy large areas.

Certain other methods have been suggested for the manufacture of carbon black, but none of them appear to have reached the practical or commercial stage of development.

Accordingly to my improvements I produce a carbon of an improved character which is peculiarly free from the above mentioned injurious constituents and undesirable characteristics, and moreover, I obtain larger quantities of carbon per unit volume of gas and in a more efficient and less expensive manner than is possible with known methods and devices.

Generally stated, my improvements reside in the continuous partial or incomplete combustion of the hydrocarbon gas in a comparatively large furnace by supplying to the furnace and to the gaseous flame predetermined quantities of air which are insufficient for complete combustion, and the passing of the resultant products of combustion through a suitable collector for isolating the liberated carbon therefrom.

I have found that the quality of the carbon yield is substantially improved by a careful and accurate adjustment of the mixture of air (oxygen containing agent) and gas supplied to the furnace, and particularly by the manner in which the mixture is accomplished. For example, the admission of the air into the furnace beneath the burners gives good results, particularly when the air is automatically supplied in regulated quantities and at predetermined pressures (preferably only slightly above atmospheric). Fairly good results have been obtained by automatically mixing the gas and air according to predetermined proportions before the mixture reaches the flame zone, but I now prefer to effect mixture by admission of the air at points beneath the flame. This application is directed more particularly to methods and devices tending toward these ends as applied to the incomplete combustion of the gas and separation of the carbon as aforesaid. I prefer also to employ these methods and devices in connection with certain other of my improvements in the manufacture of carbon as will appear hereinafter.

In the practice of my invention I have devised a furnace with a battery of comparatively large burners or gas intakes with their mouths opening into the furnace at points a short distance from the bottom of the chamber, and with an air intake or intakes disposed below the level of the burners. The hydrocarbon gas issuing from the gas intakes is caused to burn very slowly and lazily by supplying thereto predetermined quantities of air, but insufficient to produce complete combustion, the gas being supplied at a pressure above atmosphere and the burning taking place at the desired pressure. Means are provided for regulating the pressure and the volume of the gas supplied to the burners and for automatically regulating and supplying the exact quantity of air required to the furnace. Preferably this means consists of a rotary fan or blower, as good results have been obtained therewith. The resulting products of combustion and unburned gases are more or less confined or trapped in the furnace and the temperature thereof elevated to the desired degree for most efficient operation. Provision is made for the gradual exhaust of the resulting products and gases through a restricted outlet near the top of the furnace. The hot products with the liberated carbon are conducted from this outlet through a cooling system or circuit of restricted dimensions for reducing the temperature, increasing the density and reducing the volume and thence to a collector where the carbon is separated from the other constituents. The collector is preferably either of the electrical precipitation type or of the closed bag filtration type. A fan or blower together with an exhaust regulator is provided for the purpose of assisting to maintain the natural draft of the products of combustion and to impart thereto the required velocity through the restricted passages of the cooling system, as I find that the efficiency of operation and production is thereby increased. This fan may be dispensed with, however, in cases where the desired draft is otherwise obtained. The hot gases with the liberated carbon in suspension are drawn through the conduits at sufficient velocity to carry along therewith the greater portion of any flocculent carbon which may be precipitated in the cooling pipes, and substantially the whole of the liberated carbon which leaves the furnace with the gases is borne to the collector and thence recovered.

The advantages of my improved method and apparatus will more fully appear from the following detail description and the accompanying drawings, the latter being diagrammatic illustrations of the system and apparatus according to certain modifications, wherein—

Figure 1 is a diagrammatic drawing of a system embodying my improvements.

Figure 2 is a modification of the furnace and air intakes illustrated in Figure 1.

Figure 3 is a diagrammatic drawing of a modification of the system shown in Figure 1.

Figure 4 is an illustration of a modified form of collector.

Referring to these drawings I have illustrated in section a furnace 1, this furnace being of large or generous dimensions as compared with certain of the other elements of the apparatus. There are provided a number of burners 2 (only two being illustrated) which are supplied with a hydrocarbon gas, for example natural gas, through a supply pipe 3 leading to a gas main 4. A valve 5 is indicated for controlling the gas circuit and preferably the circuit is provided with a gas pressure regulator (not illustrated) for the purpose of supplying gas at a substantially uniform and constant pressure. The furnace is preferably sealed against the entrance of air or other oxygen containing agent except through an air opening 6 through which the air may be admitted at a point below the level of the burners 2. A rotary fan or blower 7 is provided for positively supplying a predetermined and regulated quantity of air through the opening 6 and down below the burners 2. A regulator 8 is provided for adjusting the size of the opening 6 and thereby enabling cooperation with the blower for effecting accurate control of the quantity of air supplied. This regulator may be of any conventional form, but is illustrated as of the shutter type by which means the air opening may be adjusted to the required area to give the exact quantity of air at atmospheric pressure desired. It is noted that the burners 2 are disposed near the bottom of the furnace and that the air opening 6 is disposed slightly below the level of these burners, this arrangement having been found to give good results. It is understood, however, that this arrangement may be varied in some respects without departing from the spirit of the invention.

Near the top of the furnace 1 there is provided a restricted outlet 9 which leads to a cooling circuit or system 10. From the cooling system 10 the furnace outlet leads through a heater 11 and from thence to a collector 12. The cooling system consists of a pipe of restricted dimensions as compared to the volume of the furnace and a water spray system 13 which may continuously spray cold water upon the cooling pipes 10 for the purpose of reducing the temperature of the products of combustion passing therethrough. The degree of cooling may be regulated by adjusting the supply of water to the spraying system as for instance by means of a valve 14 in the water main. The cooling pipes 10 are observed to slightly diminish in cross section from the front to the rearmost end. This reduction in cross section may be made because the product of combustion may be reduced in volume as they are cooled by contact with the cooling pipes. The resulting increase in density of the gases passing through the cooling and collector system promotes the efficient separation of the carbon from the other gases.

Two different types of collectors are illustrated, collector 12 being of the bag filtration type and collector 12′ (Fig. 4) being of the electrical precipitation type. The collector 12 consists generally of a container, preferably of cylindrical shape, with the hopper 15 on the lower part for collecting the carbon as it falls by gravity or is caused to fall from the filtration bags. The filtration bags are indicated diagrammatically at 16 whose open ends register with the openings 17 in the partition plate 18 carried by the container. The bags (only two of which are shown) may be carried in any suitable manner and means may be provided, if desired, for agitating or shaking the bags to loosen the carbon collected thereby. I have illustrated a novel chain arrangement for loosening the carbon. The chain 19 being suspended from the bar 20 and the whole being mounted upon a crank 21 whereby the chains may be given the necessary movement for contacting with and jostling the bags. The chains preferably are suspended to hang downwardly within the bags.

A blower or exhauster 22 is provided for assisting the natural draft of the system, the blower being connected with the upper part of the collector container through a conduit 23. There is disposed within this conduit a regulating valve 24 whereby the exhaust or draft pressure may be regulated or adjusted to a nicety.

The operation of the system may be described substantially as follows:

The natural gas having been turned on (at a pressure above that of the atmosphere), the burners are lighted and the air regulator 8 and blower 7 adjusted to supply positively the exact quantity of air desired for the most efficient operation of the system and the products of combustion resulting from the incomplete combustion of the natural gas gradually accumulate in the furnace until the upper part thereof is completely filled with the gases and the liberated carbon in suspension. The main gate 25 in the circuit being open the products of combustion with the suspended liberated carbon begin to circulate through the cooling system 10 and the blower 22 together with its regulating valve 24 are adjusted to give an exhaust pressure and velocity sufficient to carry the products of combustion together with the suspended carbon through the restricted cooling system and through the filtration bags 16 of the collector. The velocity in the cooling circuit is such that the greater portion of flocculent carbon which is precipitated or becomes deposited upon the inner walls of the cooling circuit is carried along with the main stream of products of combustion into the collector so that the great portion of the liberated carbon which leaves the furnace through the outlet 9 actually reaches the collector and is there filtered out and deposited into the hopper 15, the cleansed gases pass out through a conduit 23 and the blower 22.

I have found that the bag collectors operate very efficiently to filter out the liberated carbon and that they work particularly well at temperatures below 225° F. Efficient results for example have been obtained with the operation of the collector gases at a temperature of 170° F. to 225° F. I have also found that with the proper adjustment of the gas and air supplied to the furnace and with a proper balance of the system including the careful adjustment of the exhaust pressure and the degree of cooling that the carbon black recovered in the hopper 15 is a particularly desirable commercial product and is free from the above noted injurious constituents and undesirable qualities; moreover the yield of carbon per unit of gas is found to be greater than the yield of carbon produced by many known methods and devices.

These results are noticeable to a certain degree under various conditions of operation, but are particularly marked with temperatures in the furnace running above 1200° F. For example, with temperatures in the furnace of 1400° F. to 1800° F. (as measured by pyrometer 28), and with careful adjustment of the air admitted into the furnace, both the yield and quality of carbon produced are good. A test of the gases near the top of the furnace with one adjustment showed a total absence of free oxygen, a small percentage (1.8%) of carbon monoxide (CO) and a larger percentage (7.7%) of carbon dioxide ($CO_2$). Good results were obtained with adjustments giving other percentages of these gases. It is also observed that with an adjustment such that the products of combustion and intermixed gases are all retained above the level of the burners 2, the yield and quality are good. For example, as indicated in Figure 1, there seems under certain conditions to be a clear and defined dividing line or blanket 29 between the gases 30 above and the air below this line, and the air entering the furnace and collecting beneath this blanket is probably preheated to a certain degree before it enters the combustion and disassociation space. The increased yield of carbon per unit of gas at the higher temperature operation is probably due to the cooperation of all the elements of my process and apparatus, although it may be due in part to some disassociation of the carbon and hydrogen of unburned gas which may reach the high temperature regions of the furnace without being burned by the flame. For instance, a portion only of the disassociated and liberated carbon recovered in the collector may come from the incomplete combustion while the remainder may be due to carbon which is thermally disassociated from unburned gas ($CH_4$ methane and $C_2H_6$ ethane) escaping through the flames into the high temperature regions of the furnace, the liberated hydrogen being burned to water. It is understood, however, that I do not limit my improvements to any particular theory of operation, as it may develop later that the good results obtained are based upon a different theory of operation and reactions taking place.

I have also found that the electrical precipitator cooperates to a particular degree with my other apparatus to produce a large yield of carbon per unit of gas, although I now prefer for certain reasons the bag filtration system.

For the purpose of relieving the furnace 1 of the products of combustion or for other reasons an outlet 26 is provided and is disposed near the top of the furnace, a door 27 being positioned upon the upper end of the pipe 26 for the purpose of opening or closing the same. The heater 11 is in the nature of a steam chamber for preheating the cooled products of combustion before they enter the collectors. This may be desirable in certain cases to raise the temperature of the gases above the dew or vaporization points before they pass through the collectors. By a proper adjustment of the cooling and exhaust system the gases may be expected to lose a portion of the water or vapor content and the elevation of the temperature above the dew point before passage through the collector insures the passage of the greater portion of the water content through the collector and out with the cleansed gases as a water vapor.

In Figure 2 I have illustrated a modified form of furnace construction and air distribution. According to this modification the furnace is provided with a false bottom 31 of a construction and material such that it may withstand the temperatures in that zone of the furnace, and this false bottom is provided with a multiplicity of air openings 32 through which the air may pass upwardly into the combustion zone from the chamber beneath. The air is admitted to this chamber below the false bottom through the opening 6′ and is supplied preferably by means of a blower (not illustrated), which supplies the air in predetermined and regulated quantities to the air chamber. It is believed that this arrangement including the false bottom with the multiplicity of air openings tends to smooth out and avoid any undue drafts in the furnace above the false bottom and therefore tends to give a steadier and more efficient operation. The burners 2′ are supplied by gas supply pipes 3′, which preferably extend into the air chamber below the false bottom, the burners projecting upwardly therethrough.

In Figure 3 I have illustrated a modified system, the main difference being that in this case the air and gas are thoroughly intermixed according to predetermined proportions before the same is supplied to the burners 2. For this purpose I have provided a rotary mixing machine 33 which takes the gas from the gas machines 5 and mixes it with the air according to predetermined and adjusted proportions. The gas and air mixture thus effected is forced through the supply pipe 3 to the burners 2. This arrangement is desirable in certain cases although I now prefer the system wherein the air is supplied in the required quantities directly to the combustion space of the furnace independently of the inflowing gas. In each of the various forms of the invention a substantially uniform mixing of the hydrocarbon and fuel is obtained prior to, or in the early stages of combustion and the partial combustion reaction is carried on under uniform conditions which may be adjusted to suit the characteristics peculiar to any type of hydrocarbons which may be used in the production of the carbons. The disturbing influence of cooling plates, unguarded inflow of air and other influences which might effect the combustion reaction and impair the quality or yield of the carbon are therefore excluded.

In accordance with the requirements of the patent statutes I have set forth only one form of the many forms my invention is capable of assuming. The drawings are purposely diagrammatic for convenience in illustration, and it is understood that the claims annexed hereto are not to be construed as limited to the exact methods and devices illustrated, except as is specifically recited therein, but are to be construed to cover all modifications coming within the spirit of the invention.

I claim—

1. An apparatus for producing carbon which comprises a furnace having a free, spacious, combustion chamber, means for supplying air and gas to said furnace, means for intimately mixing said air and gas and thereafter burning said mixture gases in a manner to form free carbon, said furnace, being free from heat abstracting or heat utilizing means.

2. An apparatus for producing carbon which comprises a furnace having a free, spacious, combustion chamber, means for supplying air and gas to said furnace, and means for mixing said air and gas and thereafter burning said mixed gases in a manner to form a suspension of free carbon in said gases, said furnace being free from heat abstracting or heat utilizing means.

3. In an apparatus for separating and recovering carbon black from a hydrocarbon gas, the combination of a furnace having a spacious combustion chamber together with gas burners adapted to receive and partially burn the gas in a freely flowing mass by the supply thereto of air in quantities insufficient for complete combustion, means for supplying to said furnace and burners predetermined quantities of air, and a cooling and collecting system for receiving the resultant products.

4. In an apparatus for separating and recovering carbon black from a hydrocarbon, the combination of a furnace arranged to permit a free unobstructed flow of burning gases together with burners adapted to receive and partially burn the hydrocarbon by the supply thereto of air in quantities insufficient for complete combustion, means for supplying the hydrocarbon to said burners, means for positively furnishing to said burners and said furnace predetermined quantities of air, and a collecting system wherein the resultant products are passed at a comparatively high velocity.

5. In an apparatus for separating and recovering carbon black from a hydrocarbon, the combination of a furnace arranged to permit a free unobstructed flow of burning gases, a burner for receiving the hydrocarbon and partially burning the same, a device for supplying a predetermined proportion of air to the burners for the purpose set forth, and means for cooling the resultant products and isolating the liberated carbon content.

6. In an apparatus for separating and recovering carbon from a hydrocarbon gas, the combination of a furnace arranged to permit a free unobstructed flow of burning gases, and burners adapted to receive and partially burn the gas, a rotary blower and regulating means for supplying to the furnace and to the burners predetermined quantities and proportions of air, and a collecting system for receiving the resulting products of combustion from the furnace and isolating the liberated carbon therefrom.

7. In an apparatus for separating and recovering carbon black from a hydrocarbon gas, the combination of a furnace arranged to permit a free unobstructed flow of burning gases, a burner adapted to receive and partially burn the gas, a rotary blower and regulating means for supplying to said burner predetermined proportions and quantities of air, and a cooling and collecting system for receiving the resulting products of combustion from the furnace and isolating the liberated carbon therefrom.

8. In an apparatus for separating and recovering carbon black from a hydrocarbon gas, the combination of a furnace with burners in the lower portion thereof for receiving and partially burning the gas, a rotary blower for supplying predetermined proportions and quantities of air to said furnace at a point or points below the level of said burners, and means for subjecting the resulting products of combustion to a carbon isolating process.

9. In an apparatus for separating and recovering carbon black from a hydrocarbon gas, the combination of a furnace with a burner therein adapted to receive and partially burn the gas, means for admitting regulated quantities of air to said furnace at a point or points below the level of the burner, and means for subjecting the resulting products of combustion to a carbon isolating process.

10. In an apparatus for separating and recovering carbon black from a hydrocarbon gas, the combination of a furnace with burners disposed in the lower part thereof, a rotary blower with regulating means adapted to supply predetermined quantities and proportions of air to said furnace at a point or points below the level of the burners, and a collecting system adapted to receive the products of combustion and isolate the liberated carbon therefrom.

11. In an apparatus for separating and recovering carbon black from a hydrocarbon gas, the combination of a furnace with burners disposed in the lower part thereof adapted to receive and partially burn the gas, a rotary blower with regulating means adapted to supply predetermined quantities and proportions of air to the furnace and the burners, a cooling system of restricted dimensions through which the products of combustion are adapted to pass, a collector adapted to receive the cooled products and isolate the liberated carbon, and means for establishing the circulation of the products of combustion from the furnace and through the cooling and collecting system.

12. In an apparatus for separating and recovering carbon black from a hydrocarbon gas, a furnace having a false bottom and an air chamber therebeneath, and burners disposed above the false bottom.

13. In an apparatus for separating and recovering carbon black from a hydrocarbon gas, a furnace having gas burners disposed in the lower part thereof, said furnace having a false bottom just below the lever of the burners and said false bottom being perforated for admitting air from beneath the false bottom to and around the zones of the burners for the purpose set forth.

14. A process of producing and recovering carbon black from a hydrocarbon which comprises partially burning a hydrocarbon in a chamber in a uniform manner with an oxidizing agent insufficient for complete combustion, rapidly cooling the products of combustion and passing them through a suitable collector for isolating the carbon black.

15. A process of producing and recovering carbon black from a hydrocarbon gas which comprises partially burning the gas in a uniform manner in a chamber with a regulated quantity of an oxidizing agent insufficient for complete combustion, maintaining said gases in said chamber without abstracting substantial quantities of heat until the desired reaction has been obtained, thereupon rapidly chilling said reaction products outside the combustion chamber and separating the carbon black thereby formed from the gaseous product.

16. A process of forming and recovering carbon black from a hydrocarbon gas which comprises partially burning the gas in a chamber out of intimate contact with cooling surfaces with an oxidizing agent insufficient for complete combustion, rapidly cooling the products of said combustion and separating the carbon black from the gaseous reaction products.

17. A process of forming and recovering carbon black from natural gas which comprises partially oxidizing the hydrocarbons with a regulated quantity of oxidizing agent insufficient for complete combustion while avoiding uncontrolled cooling during said oxidation and thereupon rapidly chilling the products of combustion.

18. A process of forming and recovering carbon black from a hydrocarbon gas which comprises partially and uniformly oxidizing the gas in a body protected from uncontrolled abstraction of heat during said oxidation and thereupon rapidly chilling said products.

19. A process of forming and recovering carbon black from a hydrocarbon gas which comprises partially burning said gas with an oxidizing agent in quantities insufficient to completely oxidize said hydrocarbons, completing said partial oxidation of said hydrocarbons in a chamber of sufficiently large dimensions to maintain a body of products of combustion and exhausting the products from said chamber through a cooling system of restricted dimensions whereby a rapid cooling of said products immediately upon their withdrawal from said furnace is obtained.

20. A process of producing carbon black which consists in effecting incomplete combustion of hydrocarbons in a furnace of comparatively large dimensions and exhausting the resulting products from a point near the top of said furnace and passing them at a high velocity through a cooling system of comparatively restricted and gradually decreasing dimensions and then to a collector or separator.

21. A process of forming and recovering carbon black from a hydrocarbon gas which comprises partially oxidizing said hydrocarbon gas in a chamber with a regulated quantity of an oxidizing agent in quantities insufficient for complete oxidation of said hydrocarbons and removing the resulting products from said chamber at a high velocity through a cooling circuit to insure rapid chilling of said products immediately upon leaving said chamber.

22. The method of separating and recovering carbon black from a natural gas, consisting first of partially burning the gas at substantially atmospheric pressure in a chamber by supplying thereto predetermined quantities of oxygen or an oxygen containing agent but insufficient for complete combustion and second the passing of the resulting products through a cooling chamber and a suitable collector for isolating the liberated carbon black in flocculent form.

23. The method of separating and recovering carbon black from natural gas continuously, consisting first of partially burning the gas in a furnace by supplying thereto an oxidizing agent in quantities insufficient for complete combustion and thereby liberating a portion of the carbon content of the gas, confining the products of combustion in the furnace to complete the interaction and then passing them to a suitable collector for isolating the said carbon black.

24. The method of separating and recovering carbon black from natural gas, consisting first of partially burning the gas in a chamber of substantially atmospheric pressure by supplying thereto an oxidizing agent in quantities insufficient for complete combustion and thereby liberating a portion of the carbon content and second passing the resulting products of combustion at a comparatively high velocity through a cooling system, cooling them to a temperature below 225° F., and thence through a bag collector for isolating the said carbon black.

25. The continuous method of recovering carbon black from a hydrocarbon, consisting of liberating and freeing a portion of the carbon content in a furnace and passing the dissociated gas with the suspended carbon at a comparatively high velocity to a carbon collector.

26. The method of producing carbon black which consists in effecting incomplete combustion of natural gas at substantially atmospheric pressure and in a furnace of comparatively large dimensions and storage capacity taking the resulting products from the top of the furnace and passing them through a cooling system of restricted dimensions and through a carbon separator at a sufficiently high velocity to carry along the greater portion of any flocculent carbon and prevent its deposition on the wall of the cooling pipes.

27. A process of forming carbon black which comprises maintaining a body of hot products of combustion in a closed combustion chamber without substantial external cooling, introducing into and burning in said combustion chamber regulated proportions of hydrocarbons and air insufficient for complete oxidation of said hydrocarbons.

28. A process of forming carbon black which comprises maintaining a body of hot products of combustion in a closed combustion chamber without substantial external cooling, introducing into and burning in said combustion chamber regulated proportions of hydrocarbons and air insufficient for complete oxidation of said hydrocarbons and thereafter withdrawing and rapidly cooling said products of combustion from said furnace.

29. A process of producing carbon black which comprises supplying a regulated quantity of hydrocarbons to a combustion chamber, admitting a quantity of air to said chamber regulated to incompletely burn said hydrocarbons to form carbon, trapping and maintaining a body of products of combustion into which said hydrocarbons and air are passed and withdrawing and rapidly chilling products of combustion from said furnace.

30. A process of producing carbon black which comprises maintaining a body of hot products of combustion in an enclosed space, supplying air and hydrocarbons to said body of hot products of combustion in proportion to obtain a desired degree of partial combustion of said hydrocarbons causing said hydrocarbons and air to slowly burn in said body of hot products of combustion until the desired degree of combustion is obtained and thereupon withdrawing and quickly chilling the products of combustion.

31. The method of producing and recovering carbon from a hydrocarbon gas, consisting first of partially burning the gas by supplying thereto an oxidizing agent in quantities insufficient for complete combustion and under conditions resulting in surrounding furnace temperatures of above 1000° F., and second subjecting the resulting products to a carbon isolating operation.

32. The method of producing and recovering carbon from a hydrocarbon gas, consisting of causing the gas to issue continuously into a furnace of large dimensions, partially burning the gas by supplying thereto an oxidizing agent in quantities insufficient for complete combustion confining the resultant products and gases in the furnace and under conditions resulting in furnace temperatures above 1200° F. and ultimately removing the hot gases from the furnace and subjecting the resulting products to a carbon isolating operation.

33. The method of producing and recovering carbon from a hydrocarbon gas, consisting of causing the gas to issue continuously into a furnace, partially burning the gas by supplying thereto an oxidizing agent in quantities insufficient for complete combustion, confining the resultant products and gases in the furnace and under conditions resulting in temperatures in the furnace of above 1200° F., gradually withdrawing the products and gases from the furnace and passing them at a comparatively high velocity through a cooling and collecting system for the purpose of isolating the liberated carbon.

34. The method of producing and recovering carbon from a hydrocarbon gas, consisting of causing the gas to issue continuously into a furnace of large dimensions, partially burning the gas by supplying thereto an oxidizing agent in quantities insufficient for complete combustion, confining the resultant products in the furnace and under conditions resulting in temperatures of above 1200° F. in the furnace, reducing the volume and passing the gases through a cooling system, and finally subjecting the gases to a carbon isolating operation.

35. The method of producing and recovering carbon from a hydrocarbon gas, consisting of causing the gas to issue continuously into a furnace at a point near the bottom thereof, partially burning the gas by admitting air beneath the gas inlet in quantities insufficient for complete combustion, confining the gases in the upper part of the furnace at a temperature above 1200° F., subjecting the resulting products to a cooling operation, and finally exhausting them through a suitable collector for isolating the liberated carbon.

36. The method of producing and recovering carbon from a hydrocarbon gas, consisting in partially burning the gas, subjecting the resulting products to a temperature sufficient to cause dissociation of an unburned gas and under conditions preventing recombination, and finally subjecting the products to a carbon isolating operation.

37. The method of producing and recovering carbon from a hydrocarbon gas, consisting of partially burning the gas and subjecting the products to a temperature sufficient to cause dissociation of any unburned gas by heat energy from the incomplete combustion, and then passing the resultant products through a suitable collector or separator for the purpose of isolating the carbon.

38. The method of producing and recovering carbon from a hydrocarbon gas in a continuous manner, consisting in subjecting the gas with insufficient air for complete combustion to a temperature sufficient to cause dissociation of the hydrocarbon content, and under conditions preventing recombination, removing the resultant gasses from the high temperature regions, and subjecting the products to a carbon isolating operation.

39. The method of producing and recovering carbon from a hydrocarbon gas in a continuous manner consisting first in supjecting the gas to a temperature sufficient to cause dissociation of the hydrocarbons, second cooling the products of combustion, and third passing the cooled products through a bag collector or separator for the purpose of isolating the suspended carbon particles.

40. The method of producing carbon from a hydrocarbon, which comprises partially burning the hydrocarbon under conditions giving a larger percentage of carbon dioxide than carbon monoxide.

41. The method of producing carbon from a hydrocarbon, which consists in partially burning the hydrocarbon by adjusting the burning conditions to give at least approximately three times as much carbon dioxide as carbon monoxide.

42. The method of producing carbon from a hydrocarbon which comprises partially burning the hydrocarbon by adjusting the burning conditions to give more than 5% of carbon dioxide.

43. A process of producing carbon black which comprises partially burning a hydrocarbon gas in a furnace of comparatively large dimensions and under conditions resulting in temperatures in the upper part of the furnace of above 1400° F. and in products of combustion containing more than three times as much carbon dioxide as carbon monoxide, taking the resulting products from the furnace and passing them at a high velocity through a cooling system of restricted dimensions, and subjecting the cooled products to a carbon isolating operation.

44. A process of producing carbon black which comprises effecting incomplete combustion of hydrocarbon gas in a furnace by supplying to the lower part thereof and beneath the flame the desired quantity of air, exhausting the products of combustion from the upper part of the furnace and subjecting the same to a carbon isolating operation and adjusting the balance in said furnace to maintain the products of combustion in the furnace above the level of the burners.

45. A process of producing carbon black which comprises mixing hydrocarbons with an amount of air sufficient to incompletely oxidize said hydrocarbons, igniting said mixture of air and hydrocarbons and completing the partial combustion of said hydrocarbons in an atmosphere of products of combustion and out of contact with cold surfaces.

46. In an apparatus for separating and recovering carbon black from a hydrocarbon, the combination of a furnace for receiving and partially burning the hydrocarbon by supplying thereto oxygen in quantities insufficient for complete combustion, a cooling system through which the products of combustion are conducted from said furnace, a heating circuit through which the products of combustion are conducted after passing through the cooling system, a collector for separating the liberated carbon which is also interposed in the circulating circuit, and a suction fan for maintaining a draft through the system from the furnace to and through the collector.

47. In an apparatus for separating and recovering carbon black from a hydrocarbon, the combination of a furnace adapted to partially burn a hydrocarbon without the abstraction of a substantial quantity of heat therefrom with air in insufficient quantities for complete combustion, a cooler, a collector for separating the carbon from the gases, and means connecting the upper part of the furnace with the cooler and the collector whereby the products of combustion in the furnace may be exhausted through the cooler and finally through the collector for the purpose set forth.

48. In an apparatus for separating and recovering carbon black from a hydrocarbon gas, the combination of a furnace adapted to partially burn a hydrocarbon gas without the abstraction of substantial quantities of heat therefrom by supplying thereto air in quantities insufficient for complete combustion, a cooler for reducing the temperature of the products of combustion, a collector for receiving the products of combustion, and a blower with means connecting the furnace, cooler, collector and a suction fan in a circuit whereby the products of combustion from the furnace may be drawn through the system.

49. In an apparatus for separating and recovering carbon black from a hydrocarbon gas, the combination of a furnace adapted to partially burn a hydrocarbon gas without the abstraction of a substantial quantity of heat by supplying an insufficient amount of oxygen thereto for complete combustion, a collector for receiving the products of combustion from the furnace and separating the liberated carbon therefrom, and a suction fan for assisting in the maintenance of a draft from the furnace to and through the collector for the purpose set forth.

50. In an apparatus for separating and recovering carbon black from a hydrocarbon gas, the combination of a furnace adapted to partially burn a hydrocarbon gas without the abstraction of a substantial quantity of heat by supplying an insufficient amount of oxygen for complete combustion, and a collector for receiving the products of combustion from the furnace and separating the liberated carbon from the gases, with means connecting the furnace with the collector for the purpose set forth.

51. In an apparatus for separating and recovering carbon black from a hydrocarbon gas, the combination of a combustion chamber, a gas intake for supplying the hydrocarbon continuously to said combustion chamber at a predetermined pressure, an air intake leading into said furnace together with means for regulating the quantity of air supplied, said furnace and air and gas intakes being arranged to permit the gases to burn freely without the abstraction of substantial quantities of heat, and means for receiving the resulting products of combustion from the furnace and separating the liberated carbon from the gases.

52. In an apparatus for separating and recovering carbon black from a hydrocarbon gas, the combination of a furnace for receiving and partially burning the hydrocarbon in a gaseous phase by the supply of insufficient air for complete combustion, means for continuously supplying the hydrocarbon gas to the furnace at a point near the bottom thereof, a regulator for said gas supply means, means for supplying a predetermined quantity of air to the furnace at a point slightly below the level of the gas intakes, said furnace being arranged to burn said gases freely without the abstraction of substantial quantities of heat and a collector which is adapted to receive the products of combustion from the furnace and separate the liberated carbon from the gases.

53. In an apparatus for separating and recovering carbon black from a hydrocarbon gas, the combination of a furnace adapted to receive and partially burn a hydrocarbon in a gaseous phase by the supply of an insufficient amount of air for complete combustion, means for supplying gas at a predetermined pressure continuously to said furnace, regulatable means for supplying a predetermined quantity of air to said furnace, said furnace being arranged to permit the gases to burn freely without the abstraction of substantial quantities of heat, a collector for receiving the products of combustion from the furnace and separating the liberated carbon from the gases, and a cooler interposed between the furnace and the collector for the purpose set forth.

54. In an apparatus for separating and recovering carbon black from a hydrocarbon gas, the combination of a furnace adapted to receive and partially burn a hydrocarbon gas by the supply of an insufficient amount of oxygen for complete combustion, means for continuously supplying gas at a predetermined pressure to said furnace, air regulatable means for supplying a predetermined quantity of air to said furnace, a collector for receiving the products of combustion from the furnace and separating the carbon from the products of combustion, a cooler interposed between the collector and the furnace for reducing the temperature and increasing the density of the products of combustion, and a reheater interposed between the cooler and the collector for the purpose set forth.

55. In an apparatus for separating and recovering carbon black from a hydrocarbon gas, the combination of a furnace adapted to receive and partially burn hydrocarbon gas by the supply of an insufficient amount of oxygen for complete combustion, means for continuously supplying a hydrocarbon gas to said furnace, regulatable means for supplying a predetermined quantity of air to the furnace, a collector for receiving the products of combustion from the furnace and separating the liberated carbon therefrom, a cooler interposed between the furnace and the collector for reducing the temperature and increasing the density of the products of combustion passing from the furnace, a reheater for reheating the gases as they pass from the cooler to the collector, and a suction fan for assisting in the maintenance of the draft of the system and imparting a predetermined velocity to the products and gases through the cooling and collecting system.

56. In an apparatus for separating and recovering carbon black from a hydrocarbon gas, the combination of a furnace for partially burning a hydrocarbon gas and confining therein the products of combustion at a predetermined temperature, means for supplying gas continuously to said furnace, air supply means for supplying a regulatable quantity of air to said furnace, said furnace being arranged to permit the gases to burn freely without the abstraction of substantial quantities of heat, a collector for receiving the products of combustion from the furnace and separating the liberated carbon from the gases, a cooling system consisting of restricted passages interposed between the collector and the furnace, and means for insuring a draft of a predetermined pressure through the system.

57. In an apparatus for producing carbon black from a hydrocarbon gas the combination of a furnace adapted to partially burn and dissociate the hydrocarbon gas to form a suspension of finely divided carbon in an atmosphere of gaseous products of combustion and dissociation, said furnace being substantially free from heat abstracting means, means including a bag filter arranged to receive the products from said furnace and separate the suspended carbon therefrom.

58. In an apparatus for separating and recovering carbon black from a hydrocarbon gas, the combination of a furnace of dimensions such that it is adapted to receive a hydrocarbon gas at a point near the bottom thereof and after partial burning of the same to confine in the upper portions thereof the products of combustion resulting from incomplete combustion, means for supplying gas and air continuously to the furnace in regulated quantities, said furnace having a restricted outlet near the top thereof, a collector for receiving the products of combustion and separating the liberated carbon from the products, and a cooling system interposed between said collector and the restricted outlet which is adapted to receive the products of combustion passing from the furnace for the purpose set forth.

59. In an apparatus for producing carbon black from hydrocarbons the combination of a furnace of comparatively large dimensions and adapted to receive the hydrocarbons at a point near the bottom thereof and after partially burning the same to receive the resulting products in large volumes in the upper part thereof, means for supplying air and the hydrocarbons continuously to the furnace in regulated quantities, a collector for receiving the products of combustion, a cooling system of restricted dimensions interposed between the furnace and the collector, and a suction fan for taking the products from the top of the furnace and passing them at a high velocity through the cooling system and collector.

60. An apparatus for producing carbon black by the partial oxidation of hydrocarbon gases which comprises a furnace arranged to permit the partial oxidation of the hydrocarbon gases with regulated quantities of air in a body of hot products of combustion unobstructed with heat abstracting means and of a size to permit the dissociation of the hydrocarbons and means outside of said furnace to separate the carbon from the gaseous reaction products.

61. In an apparatus for producing carbon black, the combination of a furnace in which a hydrocarbon is burned with air supplied thereto in insufficient quantities to burn said hydrocarbon completely; means for supplying the air and the hydrocarbon to the furnace; a port disposed in the furnace for discharging the combustion products; means connected to the port for isolating the carbon black product; and an auxiliary port opening in the furnace adapted to be operated in conjunction with the discharge port opening for the purpose set forth.

62. In an apparatus for producing carbon black, the combination of a furnace in which a hydrocarbon is burned with air supplied thereto in insufficient quantities to burn said hydrocarbon completely; means for supplying the air and the hydrocarbon to the furnace; a port disposed in the furnace for discharging the combustion products; means connected to the port for isolating the carbon black product; and an auxiliary port opening in the furnace adapted to be operated in conjunction with the discharge port opening for exhausting products of combustion.

63. In apparatus for producing carbon black from a hydrocarbon, the combination of a chamber, a burner in the base of said chamber, means for supplying the hydrocarbon to said furnace, means for supplying oxygen to said furnace, means for controlling the movement of gases through said chamber comprising a valve in the upper portion of the furnace, means for removing the products of combustion from said furnace, and additional means for separating the carbon black from the products of combustion.

64. In an apparatus of the class described, the combination of a chamber, a burner in the base of said chamber, means for conveying a hydrocarbon and oxygen to said burner, a valve in the upper portion of the chamber, an outlet port in said chamber, an outlet conduit connected to said port, a cooling apparatus connected to said conduit, a separator connected to said conduit for separating products of combustion withdrawn from said chamber, and an exhaust pump attached to said conduit adapted to conduct gases from said chamber to said separator.

65. In an apparatus of the class described, the combination of a chamber a burner in the base of said chamber, means for conveying a hydrocarbon and oxygen to said burner, a valve in the upper portion of the chamber, an outlet port in said chamber, an outlet conduit connected to said port, a cooling apparatus connected to said conduit, a separator connected to said conduit for separating products of combustion withdrawn from said chamber, an exhaust pump attached to said conduit adapted to conduct gases from said chamber to said separator, and a valve in said conduit for regulating the rate of flow of gases therein.

66. The method of producing and recovering carbon from a hydrocarbon gas, consisting first of partially burning the gas in a furnace by supplying thereto an oxidizing agent in quantities insufficient for complete combustion and under conditions resulting in temperatures above 1000° F. in the furnace, second passing the gases through a cooling system, and third subjecting the gases to a carbon isolating process.

67. The method of producing and recovering carbon from a hydrocarbon gas, consisting of causing the gas to issue continuously into a furnace, partially burning the gas by supplying thereto an oxidizing agent in quantities insufficient for complete combustion, confining the gases in the furnace under conditions resulting in temperatures above 1200° F. and subsequently cooling the gases and recovering the carbon.

68. The method of separating and recovering carbon black from natural gas, consisting first of partially burning the gas in a chamber by supplying thereto an oxidizing agent in quantities insufficient for complete combustion and thereby liberating a portion of the carbon content and second cooling the carbon suspension and passing the resulting products of combustion through a bag collector for isolating the said carbon black.

In testimony whereof, I affix my signature.

CHAUNCEY MATLOCK.